INVENTORS A.H. BOBECK
J.L. SMITH
BY John F Powell
ATTORNEY

Sept. 20, 1966 A. H. BOBECK ET AL 3,274,571

MAGNETIC MEMORY CIRCUITS

Filed Aug. 7, 1962 6 Sheets-Sheet 2

INVENTORS: A.H. BOBECK
J.L. SMITH
BY John F Powell
ATTORNEY

Sept. 20, 1966 A. H. BOBECK ET AL 3,274,571

MAGNETIC MEMORY CIRCUITS

Filed Aug. 7, 1962 6 Sheets-Sheet 3

INVENTORS A.H. BOBECK
J.L. SMITH
BY John F Powell
ATTORNEY

INVENTORS: A.H. BOBECK
J.L. SMITH
BY John F Powell
ATTORNEY

INVENTORS: A.H. BOBECK
J.L. SMITH
BY John F. Powell
ATTORNEY

Sept. 20, 1966 A. H. BOBECK ET AL 3,274,571

MAGNETIC MEMORY CIRCUITS

Filed Aug. 7, 1962 6 Sheets-Sheet 6

INVENTORS: A.H. BOBECK
J.L. SMITH
BY John F Powell
ATTORNEY

United States Patent Office 3,274,571

Patented Sept. 20, 1966

3,274,571
MAGNETIC MEMORY CIRCUITS

Andrew H. Bobeck, Chatham, and James L. Smith, Bedminster, N.J., assignors to Bell Telephone Laboratories, Incorporated, New York, N.Y., a corporation of New York Filed Aug. 7, 1962, Ser. No. 215,318
20 Claims. (Cl. 340—174)

This invention relates to information storage arrangements and more particularly to such arrangements in which information is stored in the form of remanent flux states of magnetic memory elements.

Magnetic information storage arrangements employing magnetic memory elements as information storage addresses are well known in the information handling and processing art. The substantially rectangular hysteresis characteristics of the magnetic materials of which such memory elements are fabricated enable the elements to store binary values by being magnetized in either of two remanent flux states. The known toroidal magnetic core, for example, has one binary value associated with one of the remanent states and the other binary value with the other of the remanent states. Which of the binary values is stored in the core at any given time is determined by applying a read out current pulse to a winding inductively coupled to the core. Should a reversal of the magnetic flux from one of its remanent states to the other remanent state occur as a result of the applied read out current pulse, a voltage will be induced across a sensing winding also inductively coupled to the core, which voltage will be indicative of a particular binary value.

Patent 2,825,891 of S. Duinker, issued Mar. 4, 1958, discloses an information storage arrangement in which the input and read out current pulses utilize considerably less power and may recur more frequently than in toroidal core memory circuits. The circuit includes a high magnetic permeability base plate having narrow recesses therein, conductors positioned in the recesses, and magnetic material having substantially rectangular hysteresis characteristics bridging the recesses.

A severe limitation of the circuit disclosed in the Duinker patent, hereinbefore cited, results, however, because of noise problems inherent therein. Thus, whenever a signal is applied to any conductor of this circuit, noise signals are generated in all other conductors of the circuit which at any time are closely parallel to or which nonorthogonally intersect this conductor within any of the recesses. The noise signals are a result of the close inductive coupling which exists between these conductors due to the high permeability magnetic base plate which almost completely surrounds them. A substantial signal-to-noise problem inevitably accompanies the use of this circuit.

Accordingly, it is an object of this invention to provide a magnetic memory circuit in which the signal-to-noise disadvantage of the circuit of the Duinker patent is obviated; furthermore, as described hereinafter, other advantages over this circuit are achieved and the advantages possessed by this circuit are maintained.

It is another object of this invention to provide a memory array in which a greater storage density may be obtained than has heretofore been realized in such arrays utilizing toroidal cores.

It is a further object of this invention to achieve a read-write cycle time even faster than that obtainable by the circuit disclosed in the forementioned Duinker patent.

It is yet another object of this invention to provide a memory circuit which may be easily and economically assembled.

It is a further object of this invention to provide a magnetic memory circuit which is advantageously adapted to accommodate printed circuit wiring patterns.

It is a still further object of this invention to provide a new and novel memory circuit in which nondestructive interrogation is realized.

The above and other objects are realized in several embodiments of memory arrays according to the principles of this invention. One embodiment comprises a high magnetic permeability base portion having two sets of orthogonal slots cut therein forming a plurality of posts in the base portion. A sheet of magnetic material having a substantially rectangular hysteresis characteristic is positioned across the tops of the posts. Information is stored on a word-organized basis with a word winding inserted in each slot of one of the sets of orthogonal slots. Each pair of posts having a word winding therebetween together with the overlay magnetic sheet comprises a magnetic cell and adjacent ones of said cells having the same word winding therebetween comprise bit addresses of the array. Bit conductors pass in zig-zag fashion through the two sets of slots such that each bit address has a single bit conductor passing in one sense between the posts of one cell of the address and in the opposite sense between the posts of the other cell of the address. Each bit conductor passes between the posts of one bit address associated with each of the word conductors. Information is stored in the bit addresses comprising a single word by applying simultaneous input signals to a selected word conductor and to each of the bit conductors, the particular binary value stored in each bit address being determined by the polarity of the signal applied to its associated bit conductor. The input signals applied to the word and bit conductors are of a magnitude such that their sum produces a magnetizing force which exceeds the coercive force of the overlay magnetic material while their difference produces a magnetizing force less than the coercive force. One cell of each bit address of the selected word location is thereby switched from a remanent magnetic condition initially uniform in all of the cells to an opposite remanent condition. Interrogation is achieved by applying an opposite polarity signal to the word conductor of a magnitude sufficient to re-establish uniform remanent conditions in all the cells of the word location being interrogated. Signals induced on the bit conductor during interrogation are detected, their polarities manifesting the information stored in respective addresses of the interrogated word.

The noise problems of the circuit described in the Duinker patent, previously referred to, are greatly diminished by cancellation, during the read out phase of operation, of noise signals induced in the bit conductors. In each address interrogated, noise signals induced in the bit conductor, by a signal applied to the word conductor, are of opposite polarity in the two cells of the address and therefore cancel. The signal induced in the bit conductor by flux switching in the square loop overlay material of one of the cells is not cancelled because of an absence of a corresponding signal in the other cell, and its polarity is indicative of the binary value stored in the address.

Each of the word conductors may alternatively pass twice in the same direction through a selected one of the slots and return by passing once through each slot adjacent to the selected one. This reduces considerably the inductive pick up in the word conductors of extraneous noise signals. Separate sense conductors may also advantageously be used rather than the bit conductors for the sensing of output signals during the read out phase of operation thereby eliminating the necessity of applying input signals during the write phase of operation to a conductor subsequently used for sensing.

In another embodiment, nondestructive read out of information is achieved by means of two sheets of overlay material placed over the posts, the lower sheet having a relatively low coercive force and the upper sheet having a relatively high coercive force and a substantially rectangular hysteresis characteristic. Nondestructive interrogation is achieved in a manner similar to that described in the copending application of W. A. Barrett, Jr., Ser. No. 771,782, filed Nov. 4, 1958, now Patent No. 3,067,408. Information is stored in remanent magnetic conditions of the high coercive force material in a manner similar to that of the embodiment previously described. Read out is accomplished by the application of interrogating signals to word conductors of a magnitude sufficient to cause flux switching in the low coercive force overlay sheet but insufficient to cause switching in the high coercive force sheet. Following read out, the magnetic fields of the high coercive force sheet restore the flux in the low coercive force sheet to its previous condition.

The conductors may advantageously be inserted in the slots between the posts of the base plate by means of printed circuit boards. The boards comprise insulators with printed circuits etched on each side. Apertures in the board are arranged to correspond with the posts of the base plate material to enable the board to be fitted over the posts. When more than two sets of conductors are utilized, additional printed circuit boards may advantageously be used with insulating sheets separating them. The use of printed circuits not only avoids hand wiring but also insures a maximum cancellation of noise signals during read out by maintaining a precise symmetry between the windings.

In another embodiment, a reduction in the number of posts per bit address is realized. The two memory cells comprising a bit address are linearly arranged with each cell utilizing a common post. A further reduction in posts per bit address is realized by the use of a common post for two adjacent linearly arranged bit addresses.

In another embodiment, both the word conductors and the bit conductors follow straight line rather than zig-zag paths between the posts of the base plate and hand wiring techniques may therefore advantageously be utilized. Each bit address comprises four rectangularly positioned posts. Binary information is stored by means of remanent magnetizations in a square loop overlay material with the direction of magnetization being along either of the two diagonals of the posts, depending upon the particular binary value stored.

In a further embodiment, coincident current operation of a memory according to the principles of this invention is achieved. Two closely parallel word windings pass through each bit address of a word location on the base plate. Coincident current selection means selectively apply input signals to the word conductors of a magnitude such that signals applied to both word conductors of a particular word location are sufficient to reverse the remanent magnetizations in the overlay material of each memory cell of the word location from a previous uniform remanent magnetic condition while a signal applied to only one word conductor of the location is insufficient to cause such magnetization reversals. A first set of bit conductors pass between the posts of a first memory cell of each bit address and a second set of bit conductors pass between the posts of the second memory cell of each bit address. A signal is applied to one of the bit conductors of each bit address of a particular word location simultaneously with the application of coincident signals to the two word conductors of the particular location. The signals applied to the bit conductors are of a polarity and magnitude to prevent flux reversals, responsive to the coincident word signals, in the overlay material of the memory cells through which they pass. Thus, flux reversals occur in only one memory cell of each bit address of a selected word location, with the signals applied to the bit conductors determining which cell of each address undergoes switching and thereby determining the binary information values stored in the selected word location. Read out is achieved by applying coincident signals to the two word conductors of the word location selected to be interrogated and detecting signals induced in sensing conductors passing through each memory cell of respective ones of the addresses of the selected word location.

Thus according to one feature of this invention a magnetic memory array utilizing a high magnetic permeability base plate having a plurality of posts formed thereon and a square loop material positioned across the posts to form a plurality of magnetic cells has bit addresses defined therein by a set of words and a set of bit conductors; with each address including two cells, a word conductor passing between the posts of its cells in the same sense, and a bit conductor passing between the posts of its cell in the opposite senses.

According to a feature of one embodiment of this invention two sheets of material are positioned across posts formed on a high magnetic permeability base plate, one sheet having a low magnetic coercive force and the other sheet having a high magnetic coercive force.

According to another feature of an embodiment of this invention a printed circuit board having apertures therein corresponding with posts on a high magnetic permeability base plate is fitted over the posts, particular wiring patterns on the board comprising windings of a magnetic memory array.

According to a feature of another embodiment of this invention each bit address of a memory array comprises two magnetic cells, each cell including two posts formed on a high magnetic permeability base plate, with the two cells of each address sharing a common post.

According to a feature of another embodiment of this invention a magnetic memory array operating on coincident current principles is realized in which each bit address comprises two magnetic cells, each cell including two posts formed on a high magnetic permeability base plate, and each address having two closely parallel word conductors passing between the posts of each of its cells, a first bit conductor passing between the posts of one of its cells and a second bit conductor passing between the posts of the other of its cells.

It is a feature of still another embodiment of this invention that a memory array is realized in which each bit address comprises four rectangularly positioned posts formed on a high magnetic permeability base plate, a plurality of such posts being arranged in rows and columns on the plate, and in which word and bit conductors are positioned in straight line paths between selected rows and columns, respectively, of the posts.

A more complete understanding of this invention and of the above and other objects and features thereof may be gained from a consideration of the following detailed description together with the accompanying drawing in which.

Figure 1:
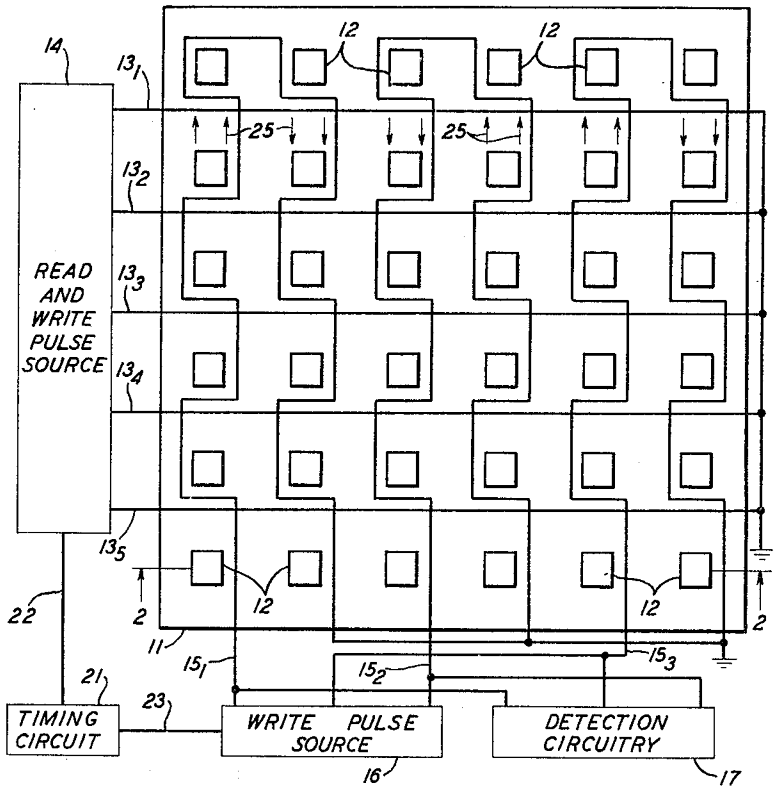
FIG. 1 depicts one specific embodiment of a memory array according to the principles of this invention.

A specific embodiment of a memory array according to this invention is shown in FIG. 1. A high magnetic permeability base plate 11 is shown having a first set of horizontal slots and a second set of vertical slots therein as viewed in the drawing. The slots may, for example, be formed by machining the base plate 11 and define a plurality of posts 12 on the plate 11. Word conductors $13_1$ through $13_5$ are positioned in respective ones of the horizontal slots and connected between a source of ground potential and pulse source 14. Bit conductors $15_1$ through $15_3$ pass between the posts 12 in zig-zag fashion as shown in FIG. 1 and are connected between a source of ground potential and both pulse source 16 and detection circuit 17.

Figure 2:
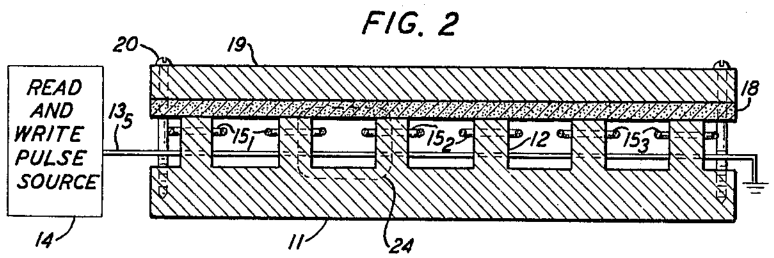
FIG. 2 depicts a sectional view of the embodiment of FIG. 1 taken along plane 2—2 shown in FIG. 1.

FIG. 2 depicts in sectional form a view of the embodiment of FIG. 1 taken along the plane represented by broken line 2—2 shown in FIG. 1. A sheet of magnetic material 18 having substantially rectangular hysteresis characteristics is positioned across the tops of the posts 12 as shown in FIG. 2. The magnetic sheet 18 is advantageously clamped tightly against the posts 12 in order to minimize the total reluctance of magnetic paths which include both the posts 12 and sheet 18. This clamping may be achieved, for example, by means of a metallic pressure plate 19 above the sheet 18 and clamping screws 20 between plate 19 and end portions of the base plate 11 which serve to hold sheet 18 tightly between pressure plate 19 and base plate 11. The magnetic sheet 18, pressure plate 19 and clamping screws 20, shown in FIG. 2, are, for illustrative purposes, not depicted in FIG. 1.

The pulse source 14, shown in FIG. 1 in block diagram form, may comprise any well known circuitry capable of providing read and write pulses of the character described hereinafter. Similarly, pulse source 16 also shown in block diagram form may comprise any well known circuit capable of providing write pulses of the character described hereinafter. Timing circuit 21 connected between source 14 and source 16 by conductors 22 and 23, respectively, is also shown in block diagram form and may comprise circuitry capable of timing the energization of the sources 14 and 16, in the manner described hereinafter, during the write phase of operation. Detection circuitry 17 is also shown in block diagram form and may comprise well known circuitry capable of detecting signals induced in the windings 15 during the readout phase of operation.

The word conductors 13 and bit conductors 15 define a plurality of bit addresses in the array with each bit address comprising two memory cells. Each memory cell defines a magnetic flux path which includes a portion of the base plate 11, two adjacent ones of the posts 12 and the portion of the sheet 18 between the adjacent posts. Such a flux path is indicated by the dotted line 24 in FIG. 2. One of the word conductors 13 and one of the bit conductors 15 pass between the posts 12 of each memory cell. Because of the zig-zag pattern of the conductors 15, the conductors 13 and 15 pass in the same sense through some of the memory cells and in the opposite sense through other ones of the cells. Each bit address comprises two adjacent memory cells, both cells having the same word conductor 13 and bit conductor 15 between the posts 12 thereof, the conductors positioned in the same sense in one cell and in the opposite sense in the other cell.

The array of FIG. 1 is of the word-organized type. That is, a binary word is associated with each one of the word conductors 13. During read out, a particular binary word is interrogated by applying a read out signal from source 14 to a particular one of the word conductors 13 to establish uniform remanent magnetic conditions in each of the memory cells associated with the particular conductor 13. As a result, output signals are induced in each of the bit conductors $15_1$ through $15_3$, the polarity of which are indicative of the binary values stored in each of the bit addresses of the word being interrogated. Bearing in mind the foregoing organization, a detailed description of the operation of this circuit will now be set forth.

Assuming all of the memory cells to be in a uniform remanent magnetic condition, which may be designated a reset condition, as a result of a previously applied negative polarity readout pulse from source 14, a binary information word is written into the array by the application of write signals simulaneously to a selected one of the word conductors 13 and to each of the bit conductors 15. The pulse from source 14 is of positive polarity while the pulses from source 16 are of positive or negative polarity depending upon the particular binary values to be written into the addresses. The write pulses applied to the conductor 13 and conductors 15 are of a magnitude such that the resulting magnetizing force exceeds the coercive force of sheet 18 only when the individual magnetizing forces produced by the two signals are additive. Thus, during the write phase of operation each bit address of the binary word being stored will have one and only one of its memory cells switched from the reset condition to an opposite remanent magnetic condition which may be designated the set condition. Binary words may be similarly stored, a word at a time, in other selected addresses of the array. A subsequent negative polarity readout signal from source 14 is applied to a selected one of the word conductors 13, the set memory cell of each bit address associated with the selected conductor 13 is switched to the reset condition, and signals indicative of the stored binary values are induced in the bit conductors $15_1$, $15_2$, and $15_3$. Other binary words stored in the array may be similarly interrogated a word at a time.

If the particular binary word 101 is to be stored in the bit addresses associated with word conductor $13_1$ and bit conductors $15_1$, $15_2$, and $15_3$, respectively, for example, a positive write signal is applied to word conductor $13_1$ simultaneously with positive write signals applied to bit conductors $15_1$ and $15_3$ and a negative write signal applied to bit conductor $15_2$. The magnetization forces effected by the signals applied to conductors $13_1$ and $15_1$ are subtractive in the left hand one of the memory cells of the bit address defined by these conductors, and as viewed in FIG. 1, but are additive in the right hand one of the cells. Thus, the remanent magnetization of only the right hand cells is switched from the reset to the set condition. Similarly, only the left hand cell of the address defined by conductors $13_1$ and $15_2$ and only the right hand cell of the address defined by conductors $13_1$ and $15_3$ are switched to the set condition. The resulting magnetic condition of the sheet 18 is depicted in FIG. 1 by the arrows 25; the upward directed arrows, as viewed in FIG. 1, representing the reset condition, and the downward directed arrows the set condition.

A subsequent negative polarity read out signal applied to word conductor $13_1$ switches each of the set memory cells back to the reset condition thereby inducing positive signals in bit conductors $15_1$ and $15_3$ and a negative signal in bit conductor $15_2$, which signals are detected by detection circuitry 17 and are indicative of the binary word 101 stored in the interrogated bit addresses.

Because of the zig-zag wiring pattern followed by the bit conductors 15, noise signals induced in the conductors 15 during the read out phase of operation are greatly diminished by cancellation. Thus, during interrogation of the bit address defined by word conductor $13_1$ and bit conductor $15_1$ noise signals induced in the portion of conductor $15_1$ between the posts 12 of the left hand cell, due to the signal applied to conductor $13_1$ and the inductive coupling between the two conductors at this point, are cancelled by similar oppositely poled noise signals induced in that portion of conductor $15_1$ between the posts 12 of the right hand cell. The signal induced in conductor $15_1$ by the resetting of the right hand cell appears undiminished at detection circuitry 17 since no similar signal is induced as a result of flux switching in the left hand cell.

Faster switching than in coincident current operation is achieved by the present invention. The write signals applied to the conductors 13 are not limited by the knee of the hysteresis loop of the sheet 18; it is only necessary that the sum of the write signals applied to the conductors 15 and 13 produce a magnetizing force which exceeds the knee while their difference produces one which does not exceed the knee. Therefore, the current signals applied to the conductors 13 may be of larger magnitude than is permissible in coincident current operation and faster switching results. Since each bit conductor 15 passes through addresses associated with more than a single word conductor 13, write signals applied to the conductors 15 are, of course, limited to a magnitude such that the knee is not exceeded.

Figure 3:
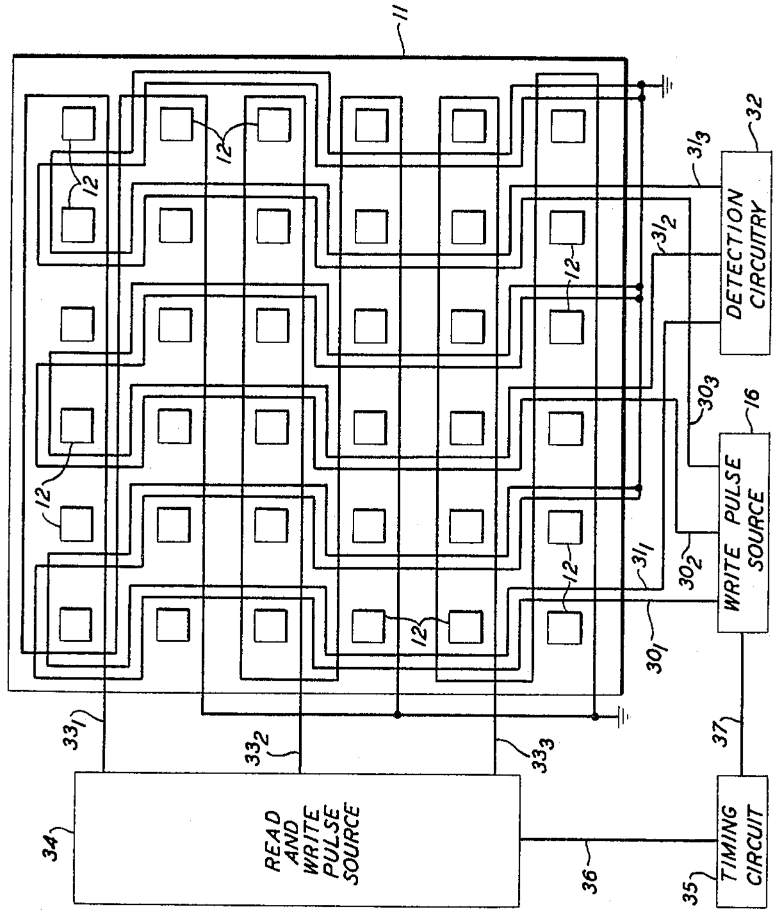
FIG. 3 depicts an embodiment utilizing wiring arrangements slightly different from those shown in FIG. 1.

FIG. 3 depicts a variation of the embodiment shown in FIGS. 1 and 2 and discussed previously. The same reference characters used in FIGS. 1 and 2 are used again in FIG. 3 to designate the same elements. Bit conductors $\mathbf{30_1}$ through $\mathbf{30_3}$ pass between posts 12 of base plate 11 in a manner similar to that of conductors 15 in the embodiment of FIG. 1 and are connected between ground potential and write pulse source 16. Output windings $\mathbf{31_1}$ through $\mathbf{31_3}$ pass between the posts 12 parallel to conductors $\mathbf{30_1}$ through $\mathbf{30_3}$, respectively, and are connected between a source of ground potential and detection circuitry 32. Word conductors $\mathbf{33_1}$ through $\mathbf{33_3}$ are positioned in the horizontal slots in plate 11 and are connected between ground potential and read and write pulse source 34. The conductors 33, however, as shown in FIG. 3, rather than being positioned in only one slot, as are the conductors 13 of FIG. 1, pass twice in the same direction through a single selected one of the slots and return by passing once through each horizontal slot adjacent the selected slot. By thus enabling the two ends of each of the conductors 33 to be terminated on the same side of base plate 11, the inductive pick up of extraneous noise signals from the word conductors 33 is considerably reduced. Source 34 shown in block diagram form may comprise any well known circuit capable of providing pulses of the character described hereinafter and circuitry 32, also shown in block diagram form, may comprise well known circuitry capable of detecting bipolar signals induced in output conductors 31. Timing circuit 35 also shown in block diagram form and connected between sources 34 and 16 by conductors 36 and 37, respectively, may comprise any well known circuitry capable of controlling the energization of sources 34 and 16 in the manner in which timing circuit 21 of FIG. 1 controls energization of sources 14 and 16 as described previously.

Since conductors 33 pass twice between the posts 12 of each memory cell of this array, the source 34 need supply pulses of only half the magnitude of those supplied by source 14 of FIG. 1. Using separate output conductors 31 eliminates the necessity of using the same conductors for both the writing of information into the array and the detection of output signals during the read out phase of operation. Since the write signals are ordinarily of substantially greater magnitude than the output signals, steps must otherwise be taken to prevent the write signals from overloading the detection circuitry or otherwise interfering with a read out phase of operation which advantageously immediately follows the write phase of operation. The operation of the circuit of FIG. 3 is virtually identical to that of the previously described circuit of FIG. 1.

Figure 4:
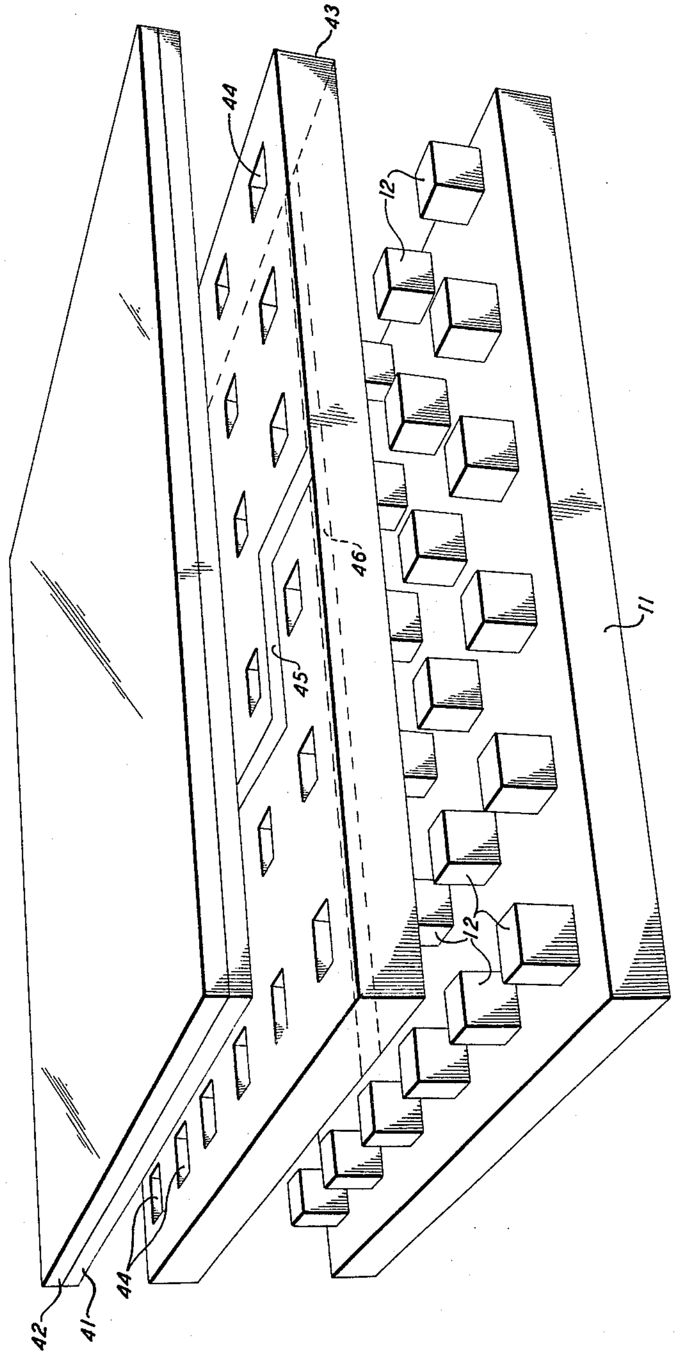
FIG. 4 depicts, in perspective and exploded view, a specific embodiment of a memory array according to this invention in which printed circuits and nondestructive readout techniques may advantageously be utilized.

FIG. 4 depicts an embodiment of the present invention which is adapted to utilize printed circuit techniques and to realize nondestructive read out of binary information stored therein. The same reference characters used in previous figures will again be repeated to designate the same elements. In this embodiment a sheet of relatively low coercive force magnetic material 41 and an adjacent sheet of relatively high coercive force material

42, both having a substantially rectangular hysteresis characteristic, are positioned over the posts 12 of base plate 11. An insulating board 43 has apertures 44 therein which correspond to the posts 12 of base plate 11 and enable the board 43 to fit over the posts. The apertures 44 may be formed in the board 43 by a stamping operation, for example. Printed circuit wiring patterns which may, for example, correspond to the conductors 13 and 15, shown in FIG. 1, are formed by conventional methods on the two sides, respectively, of board 43.

Nondestructive interrogation is realized in this embodiment in a manner similar to that described in the W. A. Barrett, Jr., patent referred to hereinbefore. Binary information words are stored in remanent magnetic conditions of the high coercive force sheet 42 in a manner similar to that previously described in connection with the embodiment of FIG. 1. Read out is accomplished by the application of interrogating signals to word conductors of a magnitude sufficient to cause flux switching in the low coercive force sheet 41 but not in the high coercive force sheet 42. The flux switching in the sheet 41 induces output signals in other conductors threading the array in a manner similar to that described for the embodiment of FIG. 1. Following readout, the magnetic fields of the high coercive force sheet 41 restore the flux in sheet 42 to the magnetic condition it manifested prior to read out. The remanent magnetization of sheet 41 may be driven to a reset condition prior to the write phase of operation by signals of sufficient magnitude applied to the word conductors.

The embodiment just described is shown in FIG. 4 in exploded view form for illustrative purposes. Also for illustrative purposes the printed wire circuitry on board 43 is not fully shown. Conductors 45 and 46, formed on opposite sides of board 43 by conventional printed circuit techniques, are shown as illustrative examples of such circuitry. The full circuitry may, for example, comprise windings identical to windings 13 and 15 shown in FIG. 1. The associated circuitry required for the operation of this circuit is also, for ease of illustration, not shown in FIG. 4 but may also comprise circuitry identical to that shown in FIG. 1 with the exception that separate read, reset and write signals must be provided for the word conductors rather than just the read and write signals supplied to conductors 13 of FIG. 1 by source 14.

A single printed circuit board 43 is sufficient if only two sets of windings, as in the embodiment of FIG. 1, need be threaded through the posts 12. One set of windings can be printed on each side of the board. When more than two sets of windings are utilized they can easily be accommodated on additional circuit boards also fitted over the posts 12. Advantageously, insulating boards are then also fitted over the posts and positioned between adjacent ones of the printed circuit boards.

Use of printed circuit wiring patterns in the array also insures a precise symmetry between the word conductors and the conductors utilized as output conductors during the read out phase of operation. A uniform inductance between the portions of these conductors which pass between the posts of the memory cells is achieved, the noise signals induced in an output conductor by read out signals on a word conductor are made of substantially identical magnitude in each cell of a bit address and a more complete cancellation of these noise signals is therefore achieved.

Figure 5:
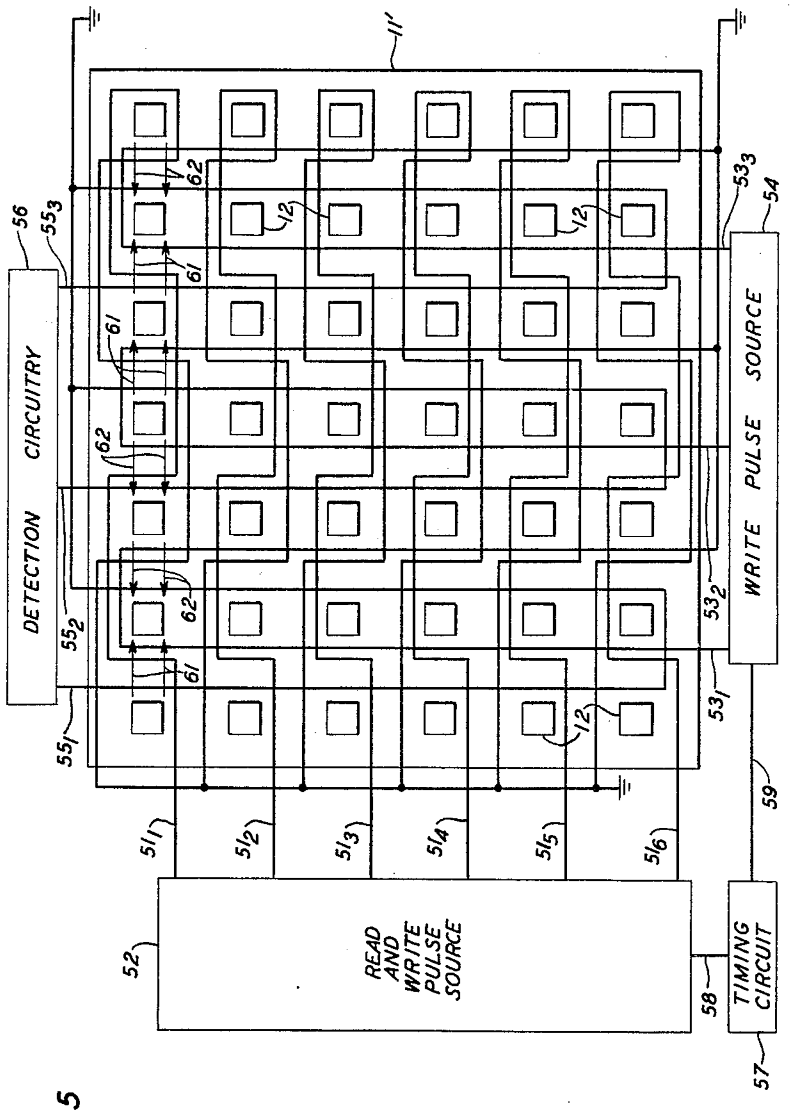
FIG. 5 depicts another specific embodiment of this invention in which a greater storage density than that of the embodiment of FIG. 3 is realized.

FIG. 5 depicts an embodiment of the present invention in which a storage density greater than that of the embodiment of FIG. 3 is realized. This is achieved by linearly arranging the two memory cells comprising a bit address and by utilizing a common post for the two cells and, in addition, a common post between adjacent linearly arranged bit addresses. Again, the same reference characters used in previous figures will be repeated to designate the same elements.

High permeability base plate 11′ is identical to plate 11 of the previous figures with the exception that it utilizes an additional vertical column of posts 12 as viewed in FIG. 5. Word conductors $51_1$ through $51_6$ are each associated with one of the horizontal rows of posts 12 as viewed in FIG. 5, pass between the posts 12, as shown in FIG. 5, and are connected between ground potential and a source of read and write signals 52.

Three bit addresses are defined in each horizontal row of posts 12 as viewed in FIG. 5. Each bit address comprises three of the posts 12 and two memory cells, each cell comprising two of the posts 12. The two cells of each address utilize a common post 12 and adjacent bit addresses of each row utilize a common post 12. Thus each row of seven posts 12 of plate 11' comprises three bit addresses. Bit conductor $53_1$ passes between the posts 12 of both memory cells of the left most bit address of each row of posts 12, as viewed in FIG. 5, and is connected between ground potential and write pulse source 54. Similarly, bit conductors $53_2$ and $53_3$ pass between the posts of the memory cells of the central and right most bit addresses, respectively, of each row of posts 12 and are also connected between ground potential and source 54. Output conductors $55_1$ through $55_3$ pass between the posts 12 parallel to conductors $53_1$ through $53_3$, respectively, and are connected between ground potential and detection circuitry 56. Sheet 18, having substantially rectangular hysteresis characteristics, is also positioned across the tops of posts 12 but for illustrative purposes is not shown in FIG. 5.

The sources 52 and 54 are shown in block diagram form and may comprise any well known circuitry capable of providing pulses of the character described hereinafter. Detection circuitry 56 is also shown in block diagram form and may comprise any well known circuitry capable of detecting bipolar signals induced in the output conductors 55. Timing circuit 57 connected between sources 52 and 54 by conductors 58 and 59, respectively, is also shown in block diagram form and may comprise any well known circuit capable of timing the energization of the sources 52 and 54 in the manner described hereinafter.

The circuit of FIG. 5 operates in a manner similar to that of previously described embodiments of the present invention. Thus, if the cells are in a reset magnetic condition and the binary word 101, for example, is to be stored in the bit addresses of the uppermost row of posts 12, as viewed in FIG. 5, a positive pulse from source 52 is applied to word conductor $51_1$ simultaneously with positive pulses from source 54 applied to conductors $53_1$ and $53_3$ and a negative pulse from source 54 applied to conductor $53_2$. The magnetizing forces effected by these signals are additive in the left hand memory cell of the addresses associated with bit conductors $53_1$ and $53_3$ and in the right hand memory cell of the address associated with bit conductor $53_2$. These cells are therefore switched to the set magnetic condition as indicated by the arrows 61 while the other cells associated with word conductor $51_1$ remain in the reset magnetic condition as indicated by the arrows 62.

Interrogation of the information so stored is accomplished by the application of a negative polarity read out signal to word conductor $51_1$ from source 52 which returns to the reset condition each of the cells switched during the write phase of operation. The resetting induces positive output signals in conductors $55_1$ and $55_3$ and a negative output signal in conductor $55_2$, which signals are indicative of the stored value 101.

Figure 6:
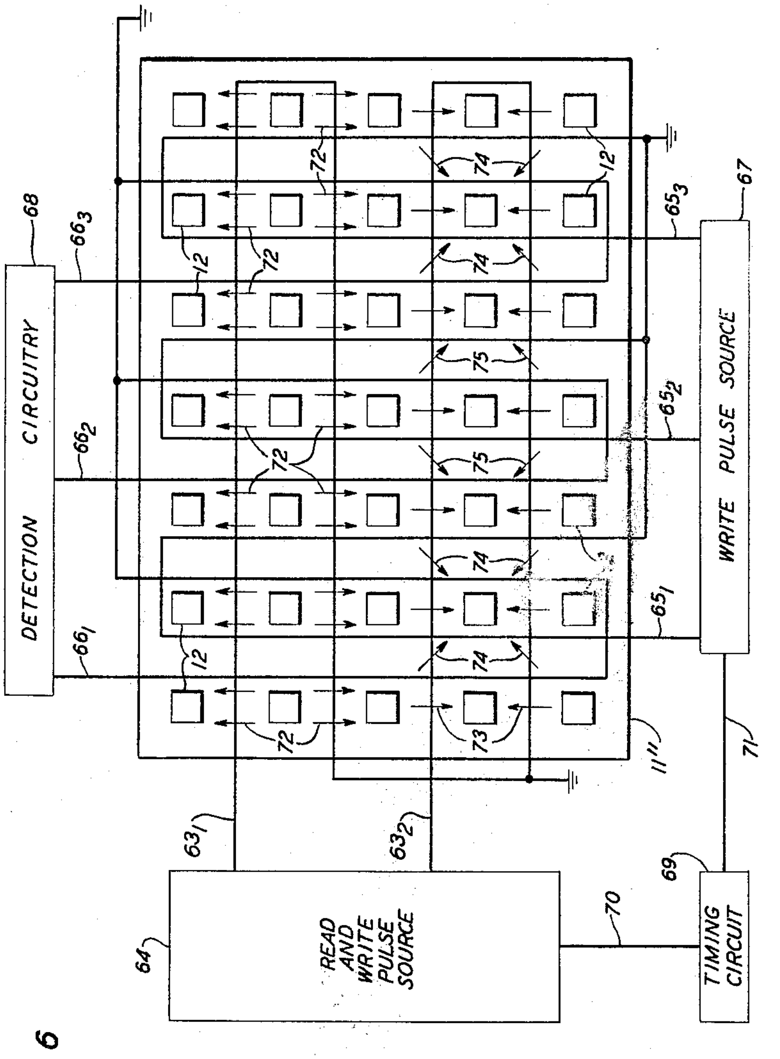
FIG. 6 depicts an embodiment of an array according to the principles of this invention in which windings therein follow straight line paths through the array.

FIG. 6 depicts another specific embodiment of the present invention in which both the word conductors and bit conductors follow straight line paths between the posts of the base plate, rather than zig-zag paths, and may therefore advantageously be positioned by hand wiring techniques. Once again the same reference characters used in previous figures will be repeated to designate the same elements.

Word conductors $63_1$ and $63_2$ each pass through one horizontal slot between posts 12 of base plate 11'' in one direction, return through an adjacent horizontal slot, and are connected between ground potential and read and write pulse source 64. Base plate 11'' is identical to base plate 11 of FIG. 1 except it has five rows of seven posts each as shown in FIG. 6. Bit conductors $65_1$ through $65_3$ and output conductors $66_1$ through $66_3$ each pass through one vertical slot between the posts 12 in one direction and return via an adjacent vertical slot and are connected between ground potential and write pulse source 67 and detection circuitry 68, respectively. Sources 64 and 67 are shown in block diagram form and may comprise any well known circuits capable of producing pulses of the character described hereinafter. Detection circuitry 68 is also shown in block diagram form and may comprise any well known circuitry capable of detecting bipolar signals induced in output conductors $66_1$ through $66_3$. Timing circuit 69 connected between sources 64 and 67 by conductors 70 and 71, respectively, is also shown in block diagram form and may comprise well known circuitry capable of timing the energization of sources 64 and 67, in the manner described hereinafter, during the write phase of operation. A sheet of magnetic material 18 having a substantially rectangular hysteresis characteristic is also positioned over the posts 12 of the embodiment of FIG. 6, but, for illustrative purposes, is not shown in FIG. 6.

The circuit of FIG. 6 also operates in a manner similar to that described previously for other embodiments of the present invention. A bit address is defined at the intersection of each word conductor 63 and bit conductor 65. Thus, the circuit shown in FIG. 6 can store two words of three binary bits each. A negative read out signal applied to a selected one of the word conductors drives each bit address associated with that conductor to the reset magnetic condition. The arrows 72 indicate the reset remanent magnetic condition of the material 18 above the bit addresses associated with word conductor $63_1$ after a read out signal has been applied to that conductor. During the write phase of operation positive write signals are selectively applied to the word conductors 63 simultaneously with write signals applied to the bit conductors 65 from source 67 which are positive or negative depending upon the particular binary value being stored. Thus, if the binary value 101 is intended to be stored in the bit addresses associated with word conductor $63_2$, a positive signal is applied to word conductor $63_2$ from source 64 simultaneously with positive signals applied to bit conductors $65_1$ and $65_3$ and a negative signal to bit conductor $65_2$ from source 67. The write signals are chosen to be of a magnitude sufficient to establish in the material 18 above these bit addresses the remanent magnetic conditions indicated by the arrows 73, 74, and 75. The diagonal arrows 74 indicate that a binary "1" is stored in the bit addresses defined by word conductor $63_2$ and bit conductors $65_1$ and $65_3$ while the diagonal arrows 75 indicate that a binary "0" is stored in the bit address defined by conductors $63_2$ and $65_2$. A subsequent negative readout signal applied to conductor $63_2$ re-establishes the reset magnetic condition in these addresses thereby inducing signals in output conductors $66_1$ through $66_3$ which are indicative of the binary word 101 stored in the array.

Since both the word conductors and bit conductors each pass through two slots in plate 11'' each bit address shown in FIG. 6 utilizes nine posts. The arrows 74 extend between five of them and the arrows 75 between the remaining four. All but one of the nine posts are shared with other bit addresses thereby establishing an effective storage density of four posts per bit address in the total structure. By using single, nonreturning word and bit conductors positioned in horizontal and vertical slots of plate 11'', respectively, bit addresses defined at the intersection of each word conductor and bit conductor would then each utilize four rectangularly arranged posts with each pair of diagonal posts constituting a memory cell of the bit address. Since all four posts are shared with other bit addresses the storage density of the total structure would then be one post per bit address. Greater storage density could thereby be obtained and the storage redundancy of the four posts per address configuration would be removed but with smaller amplitude output signals and at the risk of extraneous noise signals being induced in the bit conductor.

Since the word conductors 63 and output conductors 65 are orthogonal in this embodiment, there are no signals induced in the output conductors as a result of signals applied to the word conductors due to inductive coupling between these conductors as there is in the previously discussed embodiments of the present invention. Hence cancellation of such signals is in this embodiment unnecessary.

Figure 7:
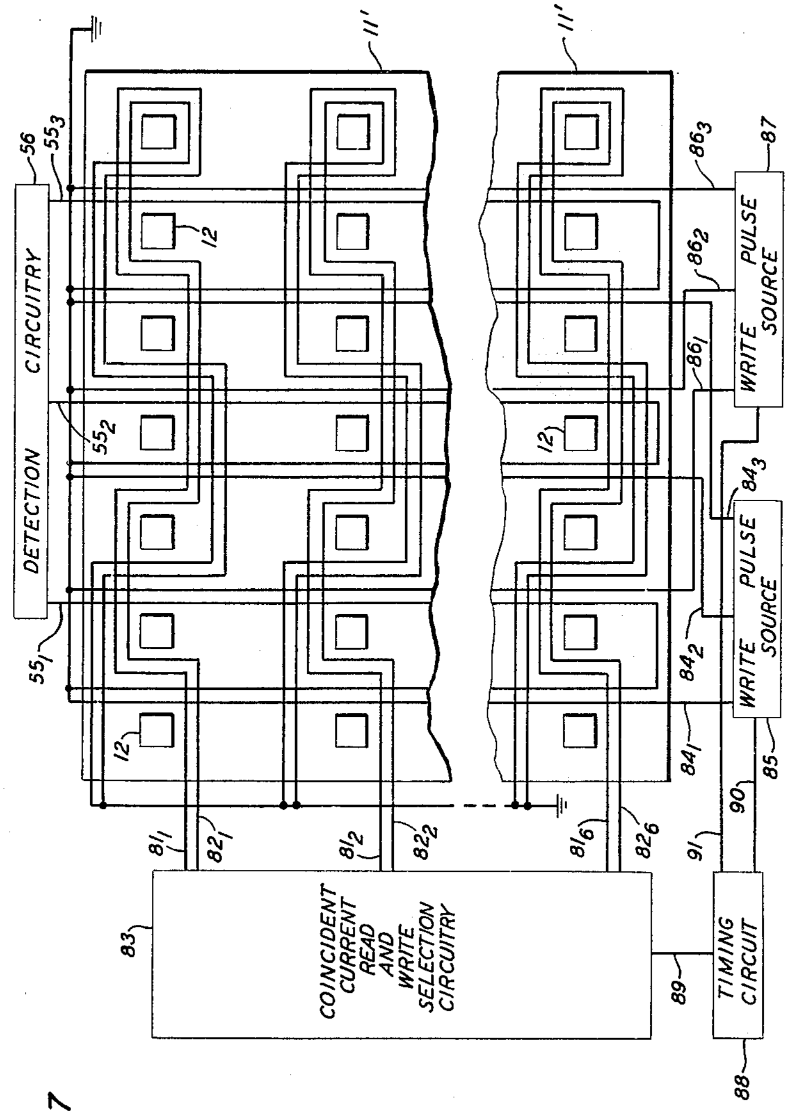
FIG. 7 depicts an embodiment of a memory array according to the principles of this invention which is adapted for coincident current operation.

Finally, FIG. 7 depicts a specific illustrative embodiment of the present invention which is adapted for coincident current operation. Once again the same reference characters used in previous figures will be repeated to designate the same elements.

High permeability base plate 11' is identical to that of FIG. 5. Similarly, output conductors $55_1$ through $55_3$ pass between the posts 12 in a manner identical to that of the similar conductors of FIG. 5 and are also connected between ground potential and detection circuitry 56. Word conductors $81_1$ and $82_1$ pass parallel to each other through the posts 12 in a pattern identical to that of word conductor $51_1$ of FIG. 5 and are connected between ground potential and coincident current read and write selection circuitry 83. Word conductors $81_2$, . . . $81_6$ and $82_2$, . . . $82_6$ pass between the posts 12 in a pattern identical to that of word conductors $51_2$ through $51_6$ of FIG. 5 and are also connected between ground potential and source 83. Bit conductors $84_1$ through $84_3$ pass through the left hand ones of the slots occupied by conductors $53_1$ through $53_3$, respectively, of FIG. 5 and are connected between ground potential and write pulse source 85 and bit conductors $86_1$ through $86_3$ pass through the right hand ones of the slots and are connected between ground potential and write pulse source 87.

Circuitry 83 is shown in block diagram form and may comprise well known circuitry capable of selectively applying coincident signals of the character described hereinafter to the conductors 81 and 82. The sources 85 and 87 are also shown in block diagram form and may comprise well known circuits capable of providing pulses of the character described hereinafter. Timing circuit 88 connected between sources 83, 85 and 87 by conductors 89, 90 and 91, respectively, is also shown in block diagram form and may comprise well known circuitry capable of timing the energization of sources 83, 85 and 87 as described hereinafter. Detection circuitry 56 may comprise well known circuitry capable of detecting bipolar output signals induced in connectors $55_1$.

The operation of the circuit of FIG. 7 is similar to that of FIG. 5. If binary word 101, for example, is to be stored in the bit addresses associated with conductors $81_1$ and $82_1$, positive write signals are applied to both of these conductors from source 83 simultaneously with negative write signals applied to bit conductors $86_1$ and $86_3$ from source 87 and a negative write signal to bit conductor $84_2$ from source 85. The positive signals applied to word conductors $81_1$ and $82_1$ are each of insufficient magnitude to effect flux switching in any of the memory cells through which they pass; however, the magnetizing force effected by the coincident application of signals to these conductors is sufficient to switch each of the cells to the set magnetic condition. The negative write signals applied to conductors $84_2$, $86_1$ and $86_3$ are of a magnitude, however, to prevent flux switching in the memory cells through which these conductors pass. As a result the remanent flux effected in the portion of sheet 18 directly above the bit addresses associated with conductors $81_1$ and $82_1$ is identical to that shown by arrows 61 and 62 for the corresponding bit addresses of FIG. 5.

Read out is accomplished by the application of coincident negative signals to conductors $81_1$ and $82_1$ which are each of a magnitude insufficient to effect flux switching but when applied coincidently reset each memory cell previously switched to the set condition. Signals induced in output conductors $55_1$ through $55_3$ at this time are indicative of the binary word 101 stored in the array.

Coincident current operation of the circuit of FIG. 7 may advantageously be applied to arrays comprising a plurality of base plates 11'. For example, one signal could be applied to each word conductor 81 of a single plane while another signal is applied to corresponding conductors 82 of each of the planes thereby selecting a single set of bit addresses defined by that pair of conductors 81 and 82 both of which have a signal applied thereto.

The posts 12 have been shown in each of the figures for illustrative purposes, as being spaced further apart than is the case in practice. The slots are advantageously made as narrow as possible in order to decrease the total magnetic reluctance of the flux path about each magnetic cell.

It is to be understood that the specific embodiments of this invention described herein are merely illustrative and that numerous other arrangements according to the principles of the invention may be devised by one skilled in the art without departing from the spirit and scope of this invention.

What is claimed is:

1. A magnetic memory circuit comprising a high magnetic permeability base plate having a bottom portion and a plurality of posts protruding from said bottom portion, an overlay magnetic sheet having substantially rectangular hysteresis characteristics positioned contiguous to said posts, a first and a second memory cell, each being defined by said bottom portion, said overlay sheet and two of said posts, each of said memory cells including a closed flux path therein, said first and second memory cells together comprising a bit address, means for establishing a first remanent magnetic condition in said first memory cell and a second remanent magnetic condition in said second memory cell indicative of a first binary value stored in said bit address and for establishing said second remanent magnetic condition in said first cell and said first remanent magnetic condition in said second cell indicative of a second binary value stored in said bit address, means for establishing said first remanent magnetic condition in both of said first and second cells, and means for detecting the flux reversals effected in either said first or said second cell when it is switched from said second to said first remanent magnetic condition.

2. A magnetic memory circuit according to claim 1 in which said means for establishing first and second remanent magnetic conditions in said first and second cells comprise a first conductor positioned in the same sense between the two posts of each of said memory cells, a second conductor positioned in opposite senses between the two posts of each of said memory cells, and means for simultaneously applying current signals of a first polarity to said first conductor and current signals of a predetermined polarity to said second conductor.

3. A magnetic memory circuit according to claim 2 in which said means for establishing said first remanent magnetic condition in both of said first and second cells comprises means for selectively applying current signals of a second polarity to said first conductor.

4. A magnetic memory circuit according to claim 3 in which said means for establishing first and second remanent magnetic conditions in said first and second cells further comprise an insulating means, said insulating means positioned between said bottom portion and said overlay sheet and adapted by means of apertures therein to fit over said posts, said first and second conductors being bonded to said insulating means.

5. A magnetic memory circuit according to claim 4 in which the posts of said first and second cells are linearly positioned on said base plate, said first cell comprising a first and a second one of said posts and said second cell comprising a third and said second one of said posts.

6. A magnetic memory circuit according to claim 1 in which said first memory cell comprises a first and a second of said posts and said second memory cell comprises a third and a fourth of said posts, said first, second, third and fourth posts being rectangularly positioned on said base plate, said first and second posts defining one diagonal and said third and fourth posts the other diagonal of said rectangle and in which said means for establishing first and second remanent conditions in said first and second cells comprise a first and a second conductor passing between said posts and orthogonally intersecting at a point between both said first and second posts and said third and fourth posts, each of said first and second conductors being inductively coupled at said intersection to the portion of said overlay material between said first and second posts and between said third and fourth posts.

7. A magnetic memory circuit according to claim 1 in which said detecting means comprises an output conductor positioned in opposite senses between the two posts of each of said memory cells.

8. A magnetic memory cell according to claim 7 in which said means for establishing first and second remanent magnetic conditions in said first and second cells comprise first and second parallel conductors positioned in the same sense between the two posts of each of said memory cells, a third conductor positioned between the posts of said first cell, a fourth conductor positioned between the posts of said second cell, and means for simultaneously applying current signals of a first polarity to both of said first and second conductors and to one of said third and fourth conductors.

9. A magnetic memory circuit comprising a high magnetic permeabiilty base plate having a bottom portion and a plurality of posts protruding from said bottom portion, said posts being positioned in rows and columns on said plate, an overlay magnetic sheet having substantially rectangular hysteresis characteristics positioned contiguous to said posts; a plurality of bit addresses being defined by said bottom portion, said overlay sheet and said posts, each bit address comprising two adjacent posts of a single row of posts and the corresponding posts of an adjacent row of the posts, one of said adjacent posts and its corresponding posts defining a first memory cell in each bit address and the other of said adjacent posts and its corresponding posts defining a second memory cell in each address, a word conductor positioned between two adjacent rows of said posts thereby passing between the posts of a plurality of bit addresses all of which are positioned in a single row, each of said plurality of bit addresses having a single bit conductor associated therewith, each bit conductor passing in one sense between the posts of one cell of its associated address and in the opposite sense between the posts of the other cell of its address, means for establishing a first remanent magnetic condition in the first cells and a second remanent magnetic condition in the second cells of particular ones of said row of addresses and for establishing said second remanent condition in the first cells and said first remanent condition in the second cells of the remaining ones of said row of addresses indicative of a binary word stored in said addresses, means for establishing said first remanent magnetic condition in both cells of each address of said row of addresses, and means for detecting the flux reversals effected in said cells when they are switched from said second to said first remanent magnetic condition.

10. A magnetic memory circuit according to claim 9 in which said means for establishing first and second remanent conditions comprises means for simultaneously applying a current signal of a first polarity to said word conductor and current signals of predetermined polarities to each of said bit conductors.

11. A magnetic memory circuit according to claim 10 in which a separate word conductor is positioned between each pair of adjacent rows of said posts.

12. A magnetic memory circuit according to claim 10 in which a plurality of word conductors are positioned between adjacent rows of said posts, each word conductor passing twice in one direction between a particular pair of adjacent rows of posts and returning once in the opposite direction between each of two other particular pairs of adjacent rows of the posts.

13. A magnetic memory circuit according to claim 9 in which said detecting means comprises output conductors associated with respective ones of said row of bit addresses, each output conductor passing in one sense between the posts of one cell of its associated address and in the opposite sense between the posts of the other cell of its address.

14. A magnetic memory circuit comprising a high magnetic permeability base plate having a bottom portion and a plurality of posts protruding from said bottom portion, first and second adjoining overlay magnetic sheets positioned contiguous to said posts, said sheets having substantially rectangular hysteresis characteristics and said second sheet having a coercive force of substantially greater magnitude than said first sheet, a first and a second memory cell, each being defined by said bottom portion, said first and second sheets and two of said posts, said first and second memory cells together comprising a bit address, means for establishing a first remanent magnetic condition in said first memory cell and a second remanent magnetic condition in said second memory cell indicative of a first binary value stored in said bit address and for establishing said second remanent magnetic condition in said first cell and said first remanent magnetic condition in said second cell indicative of a second binary value stored in said bit address, means for switching the magnetic condition of the portions of said first sheet associated with said cells from said first remanent condition to said second remanent condition without switching the corresponding portions of said second sheet from said first to said second condition, and means for detecting flux reversals effected in said portions of said first sheet.

15. A magnetic memory circuit according to claim 14 in which said first overlay sheet is contiguous to said posts.

16. A magnetic memory circuit according to claim 14 in which said means for establishing remanent magnetic conditions comprises an insulating means positioned between said bottom portion and said first and second overlay sheets and adapted by means of apertures to fit over said posts, a first pattern of electrical conductors affixed to one side of said insulating means and a second pattern of electrical conductors affixed to the other side of said insulating means.

17. A magnetic memory circuit comprising a high magnetic permeability base plate having a bottom portion and a plurality of posts extending from said bottom portion, said posts being positioned in rows and columns on said plate, an overlay magnetic sheet having substantially rectangular hysteresis characteristics positioned contiguous to said posts, a plurality of bit addresses being defined along each row of said posts by said bottom portion, said overlay sheet and said posts, each bit address comprising three of said posts and including two memory cells, a first of said cells comprising a first and second of said posts and the second of said cells comprising said second and the third of said posts, a plurality of word conductors associated with respective rows of said bit addresses and positioned such that they pass in the same sense between the posts of both memory cells of each address of said rows of addresses, a plurality of bit conductors positioned between particular columns of said posts such that each bit conductor is associated with one bit address of each row of bit addresses and passes in one sense between the posts of one memory cell and in the opposite sense between the posts of the other memory cell of each of its associated bit addresses, means for selectively applying current signals of a first polarity to selected ones of said word conductors and for applying current signals of a second polarity to a selected one of said word conductors simultaneously with current signals of predetermined polarities to said bit conductors, and means for detecting flux reversals in said overlay magnetic sheet.

18. A magnetic memory circuit according to claim 17 in which adjacent bit addresses along each of said rows of bit addresses include a common one of said posts.

19. A magnetic memory circuit comprising a high magnetic permeability base plate having a bottom portion and a plurality of posts extending from said bottom portion, said posts being positioned in rows and columns on said plate, an overlay magnetic sheet having substantially rectangular hysteresis characteristics positioned contiguous to said posts, a plurality of work conductors positioned between selected rows of said posts, a plurality of bit conductors orthogonal to said word conductors positioned between selected columns of said posts, a plurality of bit addresses being defined at the intersections of said word conductors and bit conductors, each bit address comprising four rectangularly arranged ones of said posts, means for selectively establishing remanent magnetizations along one diagonal of said rectangularly arranged posts in those portions of said overlay sheet associated with each of said bit addresses to manifest a first binary value in said addresses and for selectively establishing remanent magnetizations along the other diagonal to manifest a second binary value in said addresses, and means for selectively detecting along which diagonal a remanent magnetization has been established.

20. A magnetic memory circuit comprising a high magnetic permeability base plate having a bottom portion and a plurality of posts extending from said bottom portion, said posts being positioned in rows and columns on said plate, an overlay magnetic sheet having substantially rectangular hysteresis characteristics positioned contiguous to said posts, a plurality of bit addresses being defined along each row of said posts by said bottom portion, said overlay sheet and said posts, each bit address comprising three of said posts and including two memory cells, a first of said cells comprising a first and second of said posts and the second of said cells comprising said second and the third of said posts, a first plurality of word conductors associated with respective rows of said bit addresses and positioned such that they pass in the same sense between the posts of both memory cells of each address of their respective rows, a second plurality of word conductors positioned between said posts in the same manner as said first plurality and closely parallel to respective conductors of said first plurality, a first plurality of bit conductors positioned between particular columns of said posts such that each of said bit conductors is associated with one bit address of each row of bit addresses and passes between the posts of the first memory cell of each of its associated addresses, a second plurality of bit conductors positioned between particular other columns of said posts such that each is associated with one bit address of each row of bit addresses and passes between the posts of the second memory cell of each of its associated addresses, means for selectively applying current pulses simultaneously to a particular one of said first plurality of word conductors, to the particular one of said second plurality of word conductors associated with said last mentioned word conductor, and to one of the two bit conductors associated with each bit address of the row associated with said particular word conductors, and means for detecting flux reversals in said overlay sheet.

No references cited.

BERNARD KONICK, *Primary Examiner.*

G. LIEBERSTEIN, *Assistant Examiner.*